United States Patent
Xie et al.

(10) Patent No.: US 11,356,020 B2
(45) Date of Patent: Jun. 7, 2022

(54) SELF-CALIBRATED DC-DC CONVERTER

(71) Applicant: Texas Instruments Incorporated, Dallas, TX (US)

(72) Inventors: Zhangyi Xie, Shanghai (CN); Zhenglin Pu, Shanghai (CN); Yu Wang, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 340 days.

(21) Appl. No.: 16/546,869

(22) Filed: Aug. 21, 2019

(65) Prior Publication Data
US 2019/0379289 A1 Dec. 12, 2019

Related U.S. Application Data

(63) Continuation of application No. 16/032,718, filed on Jul. 11, 2018, now Pat. No. 10,432,092.

(Continued)

(51) Int. Cl.
*H02M 3/158* (2006.01)
*H02M 1/00* (2006.01)

(52) U.S. Cl.
CPC ......... *H02M 3/158* (2013.01); *H02M 1/0025* (2021.05); *H02M 3/1582* (2013.01); *H02M 1/0009* (2021.05); *H02M 1/0012* (2021.05)

(58) Field of Classification Search
CPC ............. H02M 1/0009; H02M 1/0012; H02M 1/0025; H02M 3/156; H02M 3/157
See application file for complete search history.

(56) References Cited

U.S. PATENT DOCUMENTS

| | | | | |
|---|---|---|---|---|
| 6,288,524 B1 * | 9/2001 | Tsujimoto | ............. | H02M 3/156 323/285 |
| 7,548,047 B1 * | 6/2009 | Dasgupta | ............. | H02M 3/156 323/283 |

(Continued)

FOREIGN PATENT DOCUMENTS

| | | |
|---|---|---|
| CN | 105048811 A | 11/2015 |
| SU | 873369 A | 10/1981 |

OTHER PUBLICATIONS

Search Report for PCT Application No. PCT US 2018 061796, dated Mar. 14, 2019, 1 page.

(Continued)

*Primary Examiner* — Jeffrey A Gblende
(74) *Attorney, Agent, or Firm* — Ray A. King; Charles A. Brill; Frank D. Cimino

(57) ABSTRACT

A circuit comprising a frequency to voltage converter having an input configured to receive a signal and an output coupled to a first node and another frequency to voltage converter having an input configured to receive a reference clock and an output coupled to a second node. The circuit also comprises a voltage source coupled between the first node and a third node, a voltage source coupled between the second node and a fourth node, a switch coupled between the first node and the third node, and a switch coupled between the second and fourth nodes. The circuit further comprises a comparator having an input coupled to the second node, another input coupled to the third node, and an output, a logic circuit having an input coupled to the comparator output and an output, and a counter having an input coupled to the logic circuit output and an output.

20 Claims, 4 Drawing Sheets

Related U.S. Application Data

(60) Provisional application No. 62/587,789, filed on Nov. 17, 2017.

(56) References Cited

U.S. PATENT DOCUMENTS

| | | | |
|---|---|---|---|
| 7,898,343 B1* | 3/2011 | Janesch | H03L 7/0891 |
| | | | 331/16 |
| 8,008,956 B1 | 8/2011 | Shin et al. | |
| 8,587,265 B2 | 11/2013 | Nishimori et al. | |
| 8,686,806 B2* | 4/2014 | Quevy | H03L 7/16 |
| | | | 331/176 |
| 9,584,014 B2 | 2/2017 | Miyazaki | |
| 2002/0125872 A1* | 9/2002 | Groom | H02M 3/156 |
| | | | 323/288 |
| 2008/0062733 A1 | 3/2008 | Gay | |
| 2008/0079407 A1* | 4/2008 | Shimada | H03K 7/08 |
| | | | 323/283 |
| 2008/0278123 A1* | 11/2008 | Mehas | H02M 3/1588 |
| | | | 323/266 |
| 2009/0079506 A1* | 3/2009 | Wu | H03L 7/113 |
| | | | 331/11 |
| 2009/0160414 A1* | 6/2009 | Hachiya | H02M 3/156 |
| | | | 323/283 |
| 2009/0237049 A1* | 9/2009 | Hachiya | H02M 3/156 |
| | | | 323/282 |
| 2011/0032008 A1* | 2/2011 | Zhao | H03K 7/08 |
| | | | 327/114 |
| 2011/0241633 A1* | 10/2011 | Herzer | H02M 3/1588 |
| | | | 323/271 |
| 2012/0153917 A1 | 6/2012 | Adell et al. | |
| 2013/0033248 A1* | 2/2013 | Granger | H02M 3/1588 |
| | | | 323/288 |
| 2014/0084886 A1* | 3/2014 | Causse | H02M 3/1588 |
| | | | 323/282 |
| 2014/0266084 A1* | 9/2014 | Fan | H02M 3/156 |
| | | | 323/222 |
| 2016/0026202 A1* | 1/2016 | Venkataraman | G05F 1/66 |
| | | | 700/298 |
| 2016/0233768 A1* | 8/2016 | de Cremoux | H02M 3/1588 |
| 2016/0252921 A9* | 9/2016 | Venkataraman | G05B 15/02 |
| | | | 700/298 |
| 2017/0019015 A1* | 1/2017 | Wibben | H02M 1/36 |
| 2017/0126119 A1* | 5/2017 | Bernardon | H02M 3/157 |
| 2017/0126124 A1* | 5/2017 | Santoro | H02M 3/158 |
| 2018/0340803 A1* | 11/2018 | Imokawa | H03J 7/02 |

OTHER PUBLICATIONS

Machine Translation for SU873369A, 7 pages.
Machine Translation for CN105048811A, 15 pages.

* cited by examiner

SELF-CALIBRATED DC-DC CONVERTER

CROSS-REFERENCE TO RELATED APPLICATIONS

Under 35 U.S.C. §§ 119(e), 120, this continuation application claims benefits of and priority to U.S. patent application Ser. No. 16/032,718 (TI-79022), filed on Jul. 11, 2018, which claims priority to U.S. Provisional Patent Application No. 62/587,789, which was filed Nov. 17, 2017, is titled "Self-Calibrated DC-DC Converter." The above referenced applications are hereby incorporated herein by reference in its entirety.

BACKGROUND

A switched mode power supply (SMPS) transfers power from an input power source to a load by switching one or more power transistors coupled through a switch node/terminal to an energy storage element (such as an inductor/transformer and/or capacitor), which is capable of coupling to the load. The power transistors can be included in a power converter that includes, or is capable of coupling to, the energy storage element. A SMPS can include a SMPS controller to provide one or more gate drive signals to the power transistor(s).

SUMMARY

Aspects of the present disclosure provide for a circuit comprising a first frequency to voltage converter having an input configured to receive a signal and an output coupled to a first node, and a second frequency to voltage converter having an input configured to receive a reference clock signal and an output coupled to a second node. In some examples, the circuit also comprises a first voltage source coupled between the first node and a third node, a second voltage source coupled between the second node and a fourth node, a first switch coupled between the first node and the third node, and a second switch coupled between the second node and the fourth node. In some examples, the circuit further comprises a comparator having a first input coupled to the second node, a second input coupled to the third node, and an output, a logic circuit having an input coupled to the output of the comparator and an output, and a counter having an input coupled to the output of the logic circuit and an output.

Other aspects of the present disclosure provide for a system comprising a power source, a load, a gate driver, a power converter, a first comparator, and a controller. In some examples, the gate driver has multiple inputs and multiple outputs. In some examples, the power converter comprises a first transistor having a gate terminal coupled to one of the gate driver outputs, a first terminal coupled to the power source, and a second terminal and an energy storage element having a first terminal coupled to the second terminal of the first transistor and a second terminal coupled to the load. In some examples, the first comparator has a first input coupled to the power converter, a second input, and an output coupled to one of the gate driver inputs. In some examples, the controller comprises a calibration loop having an input coupled to one of the gate driver outputs and an output and an on-time (TON) generator having an input coupled to the output of the calibration loop and an output coupled to the output of the first comparator. In some examples, the TON generator is configured to generate TON for controlling the gate driver to control the power converter via the gate terminal of the first transistor. In some examples, the calibration loop is configured to compare a frequency of a signal provided by the gate driver to the first transistor to a frequency of a reference clock, modify a value of a counter based on a result of the comparison of the frequency of the signal provided by the gate driver to the first transistor to the frequency of the reference clock, and control the TON generator to modify an amount of capacitance present in a timing circuit of the TON generator based on the value of the counter.

Other aspects of the present disclosure provide for a method comprising generating TON, controlling a power converter at least partially according to the generated TON, generating a switching frequency signal having a frequency approximately equal to at least one control signal provided to the power converter to control the power converter, converting the switching frequency signal to a first signal having a voltage representative of the frequency of the switching frequency signal, converting a reference clock to a second signal having a voltage representative of a frequency of the reference clock; biasing the first and second signals, comparing the biased first and second signals, modifying an output value of a counter based on a result of the comparison, and modifying an amount of capacitance in a timer of a TON generator that generates TON to modify the frequency of the switching frequency signal based on the output value of the counter.

BRIEF DESCRIPTION OF THE DRAWINGS

For a detailed description of various examples, reference will now be made to the accompanying drawings in which.

DETAILED DESCRIPTION

Figure 1:
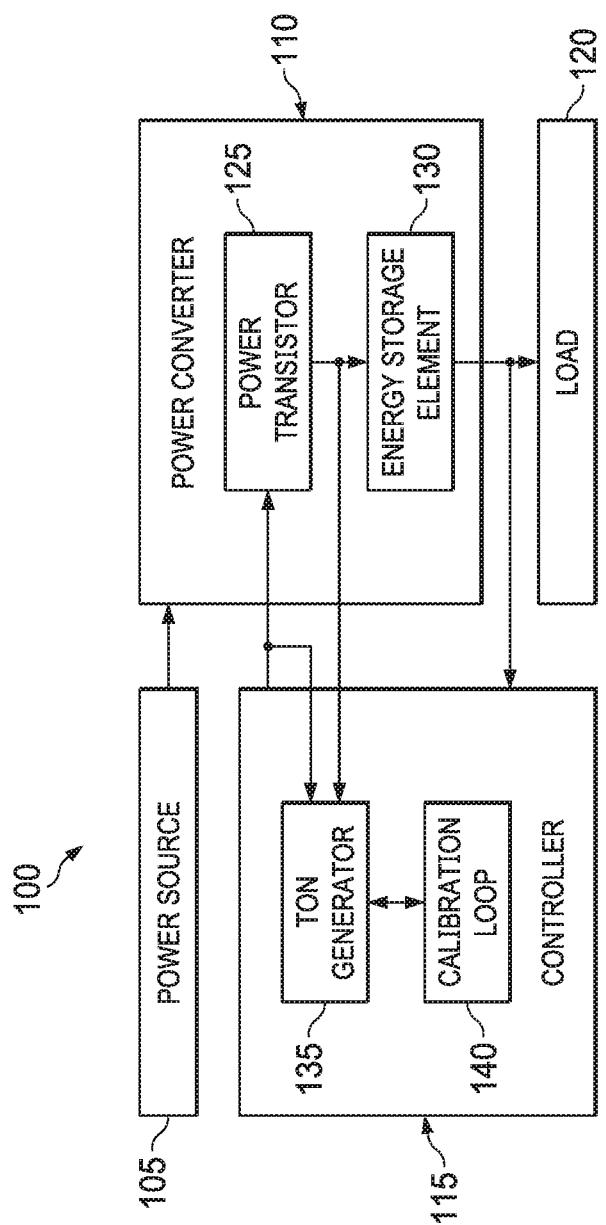
FIG. 1 shows a block diagram of an illustrative system in accordance with various examples.

In some SMPS implementations, a controller (e.g., SMPS controller, power controller, power converter controller, etc.) is coupled to a power converter and configured to control the power converter to produce an output signal (Vout) at a voltage level different than a voltage level of an input signal (Vin) received by the power converter. The controller accomplishes this control by providing one or more control signals that, either directly or indirectly (e.g., via one or more drivers such as gate drivers), control at least some power transistors of the power converter to conduct energy to charge (e.g., store energy in) an energy storage element of the power converter. A period during which the power transistor(s) are operating in the conductive state is referred to as the TON phase and the amount of time that the power transistors operate in the TON phase is defined by TON. In at least some examples, the controller determines TON based on at least some of the voltage level of Vin, the voltage level of Vout, a temperature of the power converter, characteristics of a load coupled to the power converter to receive Vout, and/or other various characteristics that may vary under certain conditions. Based on the determined TON, the controller outputs the one or more control signals to cause the power transistor(s) to operate in the TON phase or to cease operating in the TON phase (e.g., the off-time (TOFF) phase). In some examples, this control is reversed such that the controller instead determines TOFF for the power converter and TON is a programmed or designed value (e.g., such as a constant). A frequency at which the controller controls the power transistor(s) to alternate between operating in the TON phase and operating in the TOFF phase is referred to as a switching frequency.

In some implementations in which TON is a designed constant and the controller controls TOFF, an actual TON of the power converter may exceed the designed TON. For example, within, and between, both the controller and the power converter (as well as among the controller, power converter and any other components that may be in a signal path between the controller and the power converter) an inherent and/or inevitable delay may exist. As one example, the power transistors of the power converter may have certain switching delays associated with switching from the TON phase to the TOFF phase, or vice versa. Other delays may include signal propagation delays, set-up and/or hold times of digital logic structures, comparator delay, gate driver delay, etc. Gate driver delay, in some examples, describes the rising and/or falling time of a gate of a transistor during switching on or off of the transistor. Thus, although the above controller may output a control signal at a time t to cause the power converter to transition from the TON phase to the TOFF phase, the power converter may not actually transition to the TOFF phase until a time t+x, where x is an amount of inherent delay in a signal path of an architecture including the controller and the power converter. This delay and variation of an actual TON for the power converter from the designed TON may detrimentally effect operation of the power converter. For example, the variation from the designed TON may alter a value of Vout (e.g., by preventing an energy storage element of the power converter from fully charging to, and/or discharging from or to, a designated value) or alter a switching frequency of the power converter. In various examples, other characteristics may alter the value of Vout and/or the switching frequency of the converter such as process variation in components, temperature change, loading of the power converter, or the like. At high switching frequencies, for example switching frequencies greater than 800 kilohertz (KHz), the effects of the inherent delay may be more pronounced. For example, for a designed TON to provide for a designed switching frequency of 1.4 megahertz (MHZ), variation in the actual switching frequency of up to approximately thirty percent may be caused by the inherent delay. In some examples, this variation limits the use of the controller and power converter in high frequency and/or high precision application environments. In some examples, the variation further reduces efficiency of the power converter, leading to increased power loss and cost of operation of the power converter. In yet other examples, the variation generates electromagnetic interference at approximately the actual switching frequency of the power converter, which when varying from a designed switching frequency, may be unaccounted for in an electrical device and may damage, or otherwise render inoperable, the electrical device.

At least some aspects of the present disclosure provide for a controller configured to perform self-calibration to maintain approximately a desired switching frequency of a power converter. The self-calibration performed by the controller at least partially mitigates detrimental effects associated with variation in an actual switching frequency of the power converter from a designed switching frequency. The controller maintains approximately the desired switching frequency, in one example, in view of a delay inherent in the control by the controller of the power converter. In at least one example, the controller maintains approximately the desired switching frequency by generating a constant value TON based at least partially on a comparison of the actual switching frequency of the power converter with a reference signal. For example, the controller compares the actual switching frequency of the power converter with a reference signal, increments or decrements a counter based on a result of the comparison, and modifies a capacitor array of a TON generator according to a value of the counter. In at least some examples, the controller described herein operates independently of Vin, Vout, properties of a load coupled to a system including the controller, temperature, and other environmental factors.

Referring now to FIG. 1, a block diagram of an illustrative system 100 in accordance with various examples is shown. In at least one example, the system 100 is a power system that includes a power source 105, a power converter 110, and a controller 115, and is configured to couple to a load 120. The power converter 110 and the controller 115, in at least one example, are components of a SMPS that may further include, or couple to, the power source 105. The power source 105 is, for example, a battery of any suitable energy storage technology or chemical composition. In another example, the power source 105 is any other suitable device that provides a direct current (DC) signal to the system 100 at a suitable voltage level and conveying a suitable amount of current to power at least a portion of the system 100 and/or the load 120. The power converter 110 is, for example, any of a buck converter, a boost converter, a buck-boost converter, a hybrid converter, or any other suitable form of power converter, a scope of which is not limited herein. In at least one example, the power converter 110 includes a power transistor 125 and an energy storage element 130. Controlling the power transistor 125, in some examples, controls operation of the power converter 110 such that the power converter 110 is turned on when the power transistor 125 is controlled to conduct current and the power converter 110 is turned off when the power transistor 125 is controlled to not conduct current. In at least one example, when the power transistor 125 is turned on, the energy storage element 130 charges (e.g., stores energy) and when the power transistor 125 is turned off, the energy storage element 130 discharges (e.g., outputs energy). In at least one example, the energy storage element 130 is an inductor. To control the power converter 110, in at least one example the controller 115 includes a TON generator 135 and a calibration loop 140. In various examples, the controller 115 further includes any one or more of a gate driver, a detector (e.g., bottom detector), comparator, or other suitable circuitry, a scope of which is not limited herein and each of which is not shown in FIG. 1.

Each of the power converter 110 and the controller 115 are, in some examples, coupled to the power source 105. The controller 115 is further coupled to the power converter 110 (e.g., coupled to at least the power transistor 125) and the power converter 110 is configured to couple to the load 120. In various other examples, the controller 115 is coupled to the power converter 110 at one or more other locations, such as an output of the power converter 110, a sense element of the power converter 110 (which may be a terminal of the energy storage element 130 or a component configured to output a signal representative of a current flow through the energy storage element 130), or any other location according to a desired operation of the controller 115 and/or topology of the power converter 110. For example, the controller 115 may be coupled to the power converter 110 at a sense element (not shown) of the power converter 110 to receive a sense signal having a value indicative of a current flow in the power converter 110 (e.g., indicative of a current flow through the energy storage element 130). In some examples, the sense signal has a current representative of (or bearing a relationship to) the current flow in the power converter 110. In another example, the sense signal has a voltage representative of the current flow in the power converter 110. In some examples, the sense signal is attenuated prior to the controller 115 receiving the sense signal (in which case, examples described herein with respect to the controller 115 and the sense signal apply equally to the controller 115 and the attenuated representation of the sense signal).

In an example of operation of the system 100, the controller 115 controls the power converter 110 to generate Vout based at least partially on Vin received by the power converter 110 from the power source 105 and TON generated by the TON generator 135. For example, the controller 115 controls the power converter 110 by controlling the power transistor 125 to turn on according to TON (e.g., a rising edge of TON) and conduct energy or turn off according to TON (e.g., a falling edge of TON) and cease conducting energy, at least partially based on the sense signal and a switching frequency of the power converter 110. In another example, the controlling is further performed at least partially based on Vout. In various examples, the controller 115 further controls the power converter 110 according to other characteristics such as an inductor current of the power converter 110 (when the sense signal is representative of a signal other than the inductor current), a received reference value (REF) (e.g., for regulating the power converter 110 to provide Vout having a value based on REF), or any other suitable criteria or characteristic for use in controlling the power converter 110. In at least some examples, when the controller 115 determines that a value of the sense signal reaches a predefined threshold (e.g., REF), the controller 115 controls the power converter 110 to change operating modes. For example, when the system 100 is a peak current mode system, when the value of the sense signal increases to reach the predefined threshold, the controller 115 controls the power converter 110 to turn off (e.g., controls the power transistor 125 to stop conducting energy). When the system 100 is a valley current mode system, when the value of the sense signal decreases to reach the predefined threshold, in some examples the controller 115 controls the power converter 110 to turn on (e.g., controls the power transistor 125 to begin conducting energy).

When the controller 115 is configured to control the power converter 110 according to a constant (e.g., designed and preconfigured) TON, an actual TON of the power converter 110 may vary as a result of one or more delays associated with components of the controller 115, power converter 110, and/or a signal path between the controller 115 and the power converter 110. These delays may increase an actual TON of the power converter beyond the constant TON according to which the controller 115 generates control signals for controlling the power converter. The variation in the actual TON, in turn, results in an actual switching frequency of the power converter 115 that is other than a designed switching frequency associated with the constant TON. In various examples, this variation in the actual switching frequency detrimentally affects operation of the power converter 110, as discussed in greater detail above. To mitigate the delays and resulting variation in the actual TON and switching frequency, in some examples the controller 115 modifies TON to compensate for the delays and maintain the actual switching frequency approximately equal to the designed switching frequency.

In some examples, the controller 115 modifies TON via the TON generator 135 and/or the calibration loop 140. For example, the calibration loop 140 detects the actual switching frequency and determines whether the actual switching frequency varies from the designed switching frequency. When the actual switching frequency varies from the designed switching frequency, the calibration loop 140 controls the TON generator 135 to modify TON. In at least one example, the calibration loop 140 controls the TON generator 135 by outputting a control signal to the TON generator 135. The control signal, in one example, modifies a time constant of a timer of the TON generator 135 to modify TON. In one example, the control signal is a digital value having multiple bits output by the calibration loop 140 via a single bus line. In another example, the calibration loop 140 outputs a plurality of control signals to the TON generator 135 via multiple communication lines, where each communication line carries fewer than all bits of the control signal. In at least one example, the controller 115 modifies TON according to the output of the calibration loop 140 progressively until the actual switching frequency is approximately equal to the designed switching frequency. In one example, the controller 115 modifies TON until the actual switching frequency is within ten percent of the designed switching frequency. In another example, the controller 115 modifies TON until the actual switching frequency is within five percent of the designed switching frequency. In yet another example, the controller 115 modifies TON until the actual switching frequency is within two percent of the designed switching frequency.

Figure 2:
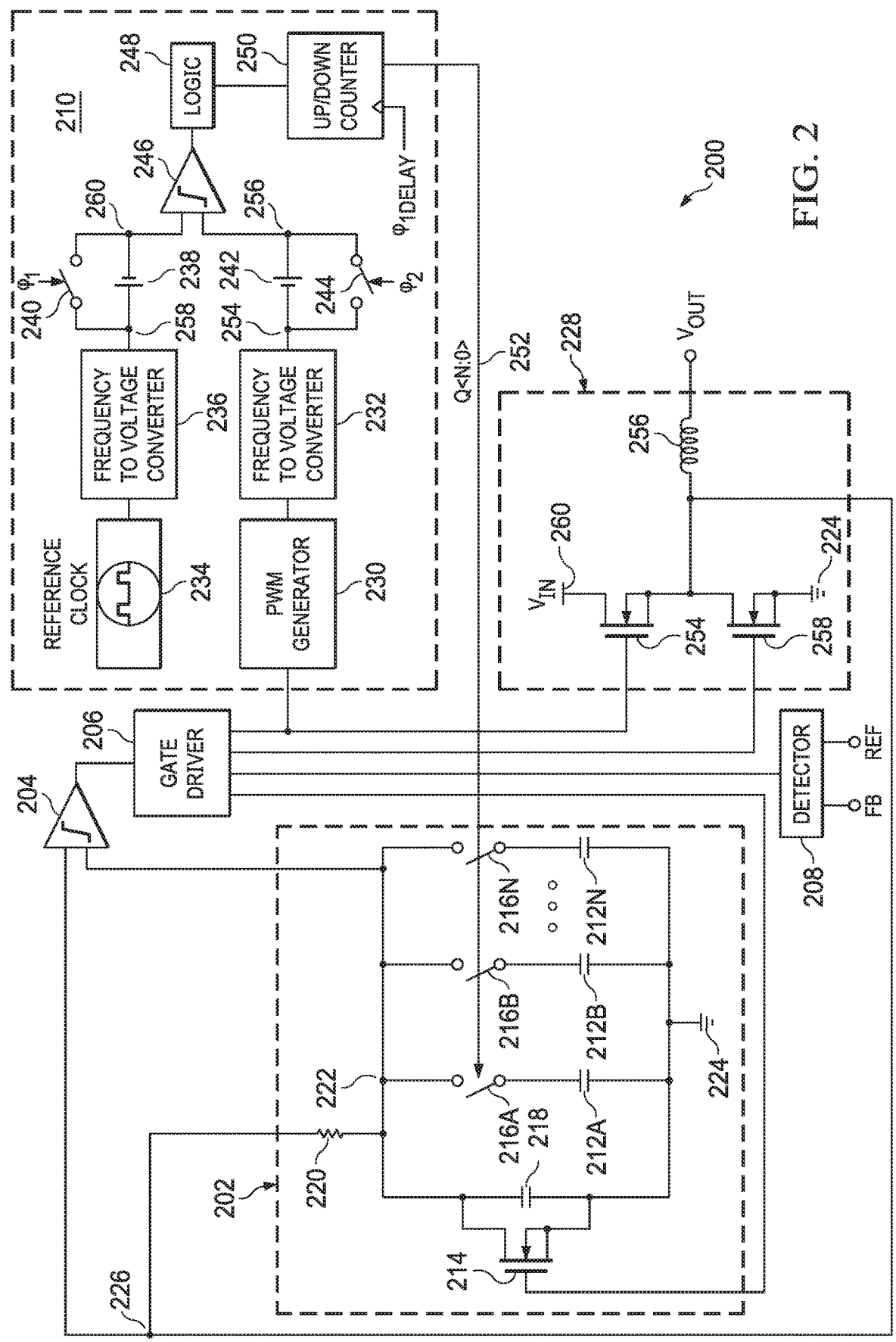
FIG. 2 shows a schematic diagram of an illustrative controller in accordance with various examples.

Referring now to FIG. 2, a schematic diagram of an illustrative controller 200 in accordance with various examples is shown. In at least one example, the controller 200 is implemented as the controller 115 of the system 100, discussed above with respect to FIG. 1.

In some examples, the controller 200 includes, or is configured to couple to, at least some of a TON generator 202, a comparator 204, a gate driver 206, a detector 208, and a calibration loop 210. At least one example of the controller 200 includes at least some aspects of the TON generator 202, the comparator 204, the gate driver 206, the detector 208, and the calibration loop 210 on a same semiconductor die and/or in a same component package, while in other examples at least some of the TON generator 202, the comparator 204, the gate driver 206, the detector 208, and/or the calibration loop 210, and/or some components thereof, may be fabricated separately and configured to couple together. Accordingly, while illustrated as including the gate driver 206, in at least one example the controller 200 does not include the gate driver 206 and instead is configured to couple to the gate driver 206.

In at least one example, the TON generator 202 includes, or is configured to couple to any one or more of, a plurality of capacitors 212A, 212B, . . . 212N, a transistor 214, a plurality of switches 216A, 216B, . . . 216N, a capacitor 218, and a resistor 220. Each of the plurality of switches 216A, 216B, . . . 216N, in some examples, is implemented according to any suitable technology or architecture suitable for performing switching, such as field effect transistors (FETs) (e.g., metal oxide FETs (MOSFETs)), bi-polar junction transistors (BJTs), and/or mechanical structures such as relays. In some examples, the capacitor 218 is coupled between a node 222 and a ground node 224, the resistor 220 is coupled between a node 226 and the node 222, and the transistor 214 is coupled at a drain terminal to the node 222, at a source terminal to the ground node 224, and at a gate terminal to an output of the gate driver 206. Further, each of the plurality of switches 216A, 216B, . . . 216N is coupled, or configured to couple, between node 222 and a first terminal of a corresponding capacitor 212A, 212B, . . . 212N and a second terminal of each of the corresponding capacitors 212A, 212B, . . . 212N is coupled, or configured to couple, to the ground node 224. In some examples, each of the switches 216A, 216B, . . . 216N is coupled, or configured to couple, at a respective control terminal to a single output of the calibration loop 210 (e.g., signal line 252). In other examples, one or more of the switches 216A, 216B, . . . 216N are coupled, or configured to couple, to one of a plurality of outputs of the calibration loop 210. For example, in at least one architecture, each of the switches 216A, 216B, . . . 216N is coupled, or configured to couple, at a respective control terminal to a unique output of the calibration loop 210 to which no other of the switches 216A, 216B, . . . 216N are coupled, or configured to couple. In such an example, each of the switches 216A, 216B, . . . 216N is coupled, or configured to couple, at a respective control terminal to a unique output of the calibration loop 210 such that each of the switches 216A, 216B, . . . 216N receives one unique bit of output of the calibration loop 210.

Although described above as including, or being configured to couple to, the plurality of capacitors 212A, 212B, . . . 212N and the plurality of switches 216A, 216B, . . . 216N (e.g., a switched capacitor array), in other examples the TON generator 202 may instead include, or be configured to couple to, one or more electrical components having a programmable and/or selectable value of capacitance. For example, the plurality of capacitors 212A, 212B, . . . 212N and the plurality of switches 216A, 216B, . . . 216N may be omitted and replaced by one or more variable capacitors, one or more digitally tuned capacitors, and/or any other component or combination of components that allows for variation in an amount of capacitance present between node 222 and ground node 224 based on a received signal (e.g., such as the output of the calibration loop 210).

In some examples, node 222 (e.g., which may function as an output of the TON generator 202) is coupled, or configured to couple, to a second input of the comparator 204 and a first input of the comparator 204 is coupled, or configured to couple, directly or indirectly, to the node 226. In at least some examples, a value present at node 226 is representative of a voltage and/or current present in a power converter 228 (which may correspond to the power converter 110 of the system 100 of FIG. 1) to which the controller 200 is coupled, or configured to couple, for controlling the power converter 228. Accordingly, the node 226 is configured to couple to the power converter 228, for example, at a source terminal of a high-side transistor 254 of the power converter 228, a terminal of an inductor 256 of the power converter 228, or any other suitable terminal, node, or component of the power converter 228. In at least one example, the coupling of node 226 to the source terminal of a high-side transistor 254 provides a signal having approximately the value of an output of a power supply 260 (e.g., Vin) when the high-side transistor 254 is conducting between its source and drain terminals (e.g., during the TON phase). A value present at node 226 may be provided according to any suitable means, the scope of which is not limited herein.

At least some examples of controller 200 further include circuitry (not shown) coupled between node 226 and the first input of the comparator 204 to scale (e.g., reduce the value of) the signal present at node 226 prior to providing the scaled signal to the first input of the comparator 204. The circuitry may be any circuitry suitable for scaling the signal present at node 226, the scope of which is not limited herein, and in at least one example includes a resistor ladder and one or more filters (e.g., resistor-capacitor low-pass filters). An output of the comparator 204 and an output of the detector 208 are each coupled to inputs of the gate driver 206. In various examples, the gate driver 206 includes a plurality of outputs, at least some of which are configured to couple to and control the power converter 228. For example, the gate driver 206 includes a plurality of outputs, at least some of which are configured to couple to respective gate terminals of transistors of the power converter 228 (e.g., at least the high-side transistor 254 and a low-side transistor 258). In various examples, a number of outputs of the gate driver 206 configured to couple to respective gate terminals of transistors of the power converter 228 may vary based on an architecture of the power converter 228. For example, some architectures of the power converter 228 may contain more or fewer transistors than other architectures of the power converter 228 based on an intended function or operation of the power converter 228. In at least some examples, at least one output of the gate driver 206 (e.g., such as an output of the gate driver 206 that is coupled, or configured to couple, to a gate terminal of the high-side transistor 254 of the power converter 228) is coupled, or configured to couple, to an input of the calibration loop 210. While illustrated as a buck converter in FIG. 2 for the sake of simplicity of understanding, the power converter 228 is not limited to a buck converter and may be any form of power converter architecture.

In at least one example, the calibration loop 210 includes, or is configured to couple to, at least some of pulse width modulation (PWM) generator 230, a first frequency to voltage converter 232, a reference clock generator 234, a second frequency to voltage converter 236, a voltage source 238, a switch 240, a voltage source 242, a switch 244, a comparator 246, a logic circuit 248, and a counter 250. In at least some examples, the PWM generator 230 is coupled, or configured to couple, between an input terminal (not shown) of the calibration loop 210 (e.g., at which an input is received from the gate driver 206, as described above) and an input of the first frequency to voltage converter 232 and an output of the first frequency to voltage converter 232 is coupled to a node 254. In yet other examples, the PWM generator 230 is omitted and the input of the first frequency to voltage converter 232 directly receives the input from the gate driver 206.

In some examples, the reference clock generator 234 is implemented within the calibration loop 210 and/or outside the calibration loop 210 but within the controller 200, and generates a reference clock according to any suitable approach and/or architecture of the reference clock generator 234, the scope of which is not limited herein. In other examples, the reference clock generator 234 is representative of a received reference clock, received from a component (not shown) external to the calibration loop 210 and/or the controller 200 but which may generate and provide the reference clock to the controller 200 and/or the calibration loop 210 (e.g., via a reference clock input terminal of the controller 200 and/or the calibration loop 210). In at least some examples, the reference clock is a signal having a frequency approximately equal to a desired switching frequency for control by the controller 200 of the power converter 228 (e.g., at least partially via the TON generator 202 and/or the gate driver 206). An output of the reference clock generator 234 (or at a terminal at which the reference clock is received when the reference clock generator 234 is not included within the calibration loop 210 or controller 200) is coupled to an input of the second frequency to voltage converter 236 and an output of the second frequency to voltage converter 236 is coupled to a node 258.

Each of the voltage source 238 and the switch 240 are coupled between the node 258 and a node 260 and each of the voltage source 242 and the switch 244 are coupled between the node 254 and a node 256. Each of the switch 240 and the switch 244, in some examples, is implemented according to any suitable technology or architecture suitable for performing switching, such as FETs (e.g., MOSFETs), BJTs, and/or mechanical structures such as relays. In at least one example, the switch 240 is configured to receive a first pulse-width modulated signal (illustrated in FIG. 2 as $\varphi_1$) at a control terminal of the switch 240 and the switch 244 is configured to receive a second pulse-width modulated signal (illustrated in FIG. 2 as $\varphi_2$) at a control terminal of the switch 244. The first and second pulse-width modulated signals may be received from any suitable component implemented within, or external to the calibration loop 210 and/or the controller 200, the scope of which is not limited herein. In at least one example, the voltage source 238 is oriented such that a positive terminal of the voltage source 238 is coupled, or configured to couple, to the node 258 and a negative terminal of the voltage source 238 is coupled, or configured to couple, to the node 260. In at least one example, the voltage source 242 is oriented such that a positive terminal of the voltage source 242 is coupled, or configured to couple, to the node 256 and a negative terminal of the voltage source 242 is coupled, or configured to couple, to the node 254. In some examples, the voltage source 238, switch 240, voltage source 242, and switch 244 set (e.g., via values of the voltage source 238 the voltage source 242 and/or switching of the switch 240 and switch 244) a dead band (e.g., trap zone) that prevents the switching frequency from varying outside of a range encompassed by the dead band after the switching frequency is calibrated according to the present disclosure to exist in the range encompassed by the dead band.

The comparator 246 is coupled, or configured to couple, at a first input terminal to the node 260 and at a second input terminal to the node 256. The comparator 246 is further coupled, or configured to couple, at an output terminal to an input terminal of the logic circuit 248. The logic circuit 248 is coupled at an output to an input of the counter 250. The counter 250 is, in some examples, configured to receive a delayed version of the first pulse-width modulated signal (illustrated in FIG. 2 as $\varphi_{1delay}$) received by the switch 240. The delayed version of the first pulse-width modulated signal is delayed, in some examples, by passing the first pulse-width modulated signal through one or more series connected inverters to delay the first pulse-width modulated signal compensate for processing time of the comparator 246 and/or logic circuit 248 prior to a counting action of the counter 250. For example, on each rising edge (or alternatively, each falling edge) of the delayed version of the first pulse-width modulated signal, the counter 250 may count up or down by a value of one. In at least some examples, an output of the counter 250 is coupled, or configured to couple, to an output terminal (not shown) of the calibration loop 210 to which signal line 252 couples to provide the output of the counter 250 to control terminals of one or more of the plurality of switches 216A, 216B, . . . 216N. In some examples, the counter 250 is instead configured to receive a delayed version of the second pulse-width modulated signal received by the switch 244 and operate in a manner substantially similar to that discussed above with respect to the first pulse-width modulated signal.

In various examples, the logic circuit 248 includes any suitable circuitry for performing the processing, operations, and/or control described herein, the scope of which is not limited by the present disclosure. For example, in various implementations the logic circuit 248 includes one or more digital logic gates, one or more data storage elements and/or delay elements, and/or any other suitable circuitry for performing the operations disclosed herein.

Similarly, in various examples, the first frequency to voltage converter 232 and the second frequency to voltage converter 236 each include any suitable circuitry for performing the processing, operations, and/or control described herein, the scope of which is not limited by the present disclosure. For example, in various implementations the first frequency to voltage converter 232 and the second frequency to voltage converter 236 each include one or more digital logic gates, one or more filters (e.g., resistor-comparator low-pass filters), one or more signal generators (e.g., PWM generators), and/or any other suitable circuitry for performing the operations disclosed herein.

In at least one example of operation of the controller 200, the calibration loop 210 is configured to control the TON generator 202 to generate a TON to control the gate driver 206 to control the power converter 228 at a switching frequency approximately equal to the reference clock. The capacitor 218 and resistor 220 form a timing circuit for generating TON for controlling the gate driver 206. The TON, in some examples, is equivalent to a value of the resistance of the resistor 220 multiplied by a value of capacitance of the capacitor 218. For example, based on the value of the resistance of the resistor 220 and the value of capacitance of the capacitor 218, a voltage present at node 222 will slowly increase as the capacitor 218 is charged. When the voltage present at node 222 exceeds a threshold with respect to a voltage present at node 226 (e.g., when the voltage present at node 222 exceeds the voltage present at node 226) an output of the comparator 204 will toggle from outputting a logical high signal to outputting a logical low signal. In at least some examples, the comparator 204 outputting a logical low signal indicates that the power converter 228 is not operating in the TON phase and indicates to the gate driver 206 to control the power converter 228 to operate in the TON phase, for example, based at least partially on the output of the TON generator 202. In at least some examples, the gate driver 206 further controls the power converter 228 based at least partially on an output of the detector 208. For example, when the detector 208 is a bottom detector and a feedback signal (FB) (e.g., Vout or a signal representative of Vout, such as scaled, sensed, detected, or otherwise interacted with via one or more components) drops below REF that indicates a desired voltage value for Vout, or a desired voltage value for the signal representative of the desired voltage value for Vout, the detector 208 provides an output to the gate driver 206 indicating that the output of the power converter 228 is less than the desired voltage value for the output of the power converter 228. In some examples, this output of the detector 208 functions as a trigger to at least partially control the gate driver 206 to control the power converter 228 to operate in the TON phase. For example, gate driver 206 may control the power converter 228 based on the output of the comparator 204, based on the output of the detector 208, or based on a combination of the output of the comparator 204 and the output of the detector 208. While the detector 208 is described above with reference to a bottom detector, in some examples the detector 208 is instead a peak detector that, when the detector 208 is a peak detector and FB exceeds REF, the detector 208 provides an output to the gate driver 206 indicating that the output of the power converter 228 is greater than the desired voltage value for the output of the power converter 228 and gate driver 206 controls the power converter 228, as discussed above.

The gate driver 206 controls the power converter 228 according to any suitable control method and/or architecture of the gate driver 206, the scope of which is not limited herein. In at least one example, based on the output of the comparator 204 and/or the detector 208, the gate driver 206 controls the power converter 228 to operate in the TON phase. The gate driver 206 controls the power converter 228 to operate in the TON phase by transmitting one or more gate control signals to the power converter 228, for example, to respective gate terminals of transistors of the power converter 228 to cause those transistors to either conduct, or not conduct, energy between their respective source and drain terminals. In some examples, an output of the gate driver 206 is further provided to the calibration loop 210 to enable the calibration loop 210 to monitor the frequency at which the gate driver 206 is controlling the power converter 228 (e.g., controlling the high-side transistor 254 of the power converter 228 to conduct, or not conduct, energy). In yet other examples, an output of the gate driver 206 is provided to a gate terminal of the transistor 214 to control operation of the transistor 214. For example, the gate driver 206 controls transistor 214 to short node 222 to ground node 224 to clear or reset the TON generator 202 (e.g., discharge the capacitor 218 and/or at least some of the capacitors 212A, 212B, . . . 212N). In some examples, the gate driver 206 provides a control signal sufficient to cause the transistor 214 to conduct current between its respective source and drain terminals approximately at a time that the gate driver 206 controls the high-side transistor 254 of the power converter 228 to no longer conduct current between its respective source and drain terminals. Further, the gate driver 206 provides a control signal insufficient to cause the transistor 214 to conduct current between its respective source and drain terminals approximately at a time that the detector 208 provides a signal to the gate driver 206 indicating that a value of the output of the power converter 228 is insufficient with respect to the desired voltage value for the output of the power converter 228.

Based on the gate control signal received from the gate driver 206, the calibration loop 210 monitors the frequency at which the gate driver 206 is controlling the power converter 228 and modifies a control signal (e.g., provided via signal line 252) for controlling at least some of the plurality of switches 216A, 216B, . . . 216N of the TON generator 202. For example, the PWM generator 230 receives the gate control signal from the gate driver 206 and generates a PWM a switching frequency signal (e.g., a PWM signal) representative of the frequency at which the gate driver 206 is controlling the power converter 228. In some examples, the reference clock generator 234 generates a reference clock having an approximate value representative of a desired approximate value of the switching frequency. In other examples, the reference clock generator 234 is representative of a terminal at which the reference clock is received from another component. The first frequency to voltage converter 232 converts the switching frequency signal to a new signal present at node 254 having a voltage representative of a frequency of the switching frequency signal and the second frequency to voltage converter 236 converts the reference clock to a new signal present at node 258 having a voltage representative of a frequency of the reference clock. The first frequency to voltage converter 232 and the second frequency to voltage converter 236 convert the switching frequency signal and the reference clock, respectively, to the new signals according to any suitable means and according to any suitable circuit architecture, the scope of which is not limited herein.

In some examples, the voltage source 238 biases node 258 to set an upper limit for variation of the switching frequency from the reference clock and the voltage source 242 biases node 254 to set a lower limit for variation of the switching frequency from the reference clock. For example, to allow a +/− five percent variation in the switching frequency from the reference clock, the voltage source 238 biases node 258 with a voltage having a value approximately five percent higher than the output of the second frequency to voltage converter 236 and the voltage source 242 biases node 254 with a voltage having a value approximately five percent lower than the output of the second frequency to voltage converter 236. In various examples, by varying a value of the voltage of one, or both, of the voltage source 238 and/or the voltage source 242, upper and lower limits of the switching frequency with respect to the reference clock are set. For example, by increasing the value of the voltage of the voltage source 238 the upper limit of the switching frequency with respect to the reference clock is increased and by lowering the value of the voltage of the voltage source 238 the upper limit of the switching frequency with respect to the reference clock is decreased. Similarly, by increasing the value of the voltage of the voltage source 242 the lower limit of the switching frequency with respect to the reference clock is increased and by lowering the value of the voltage of the voltage source 242 the lower limit of the switching frequency with respect to the reference clock is decreased.

The switch 240 selectively couples node 258 to node 260 and the second switch 244 selectively couples node 254 to node 256. The switch 240 selectively couples node 258 to node 260 at a rate determined by the first pulse-width modulated signal received by the switch 240. In at least some examples, the first pulse-width modulated signal is a 50% duty cycle signal. The switch 244 selectively couples node 254 to node 256 at a rate determined by the second pulse-width modulated signal received by the second switch 244. In at least some examples, the second pulse-width modulated signal is a 50% duty cycle signal. In other examples, the first pulse-width modulated signal and the second pulse-width modulated signal each have any suitable duty cycle allowing sufficient time for processing by at least the comparator 246 (and, optionally, the logic circuit 248) before toggling of the switch 240 and the switch 244 alters a value of the inputs received by the comparator 246.

In at least one example, the comparator 246 compares values of the signals present at nodes 260 and 256 and outputs a comparison result indicating whether the value of the signal present at node 260 exceeds the value of the signal present at node 256. In some examples, the switch 240 selectively coupling node 258 to node 260 and the second switch 255 selectively coupling node 254 to node 256 enables the single comparator 246 (and, in some examples, in combination with operations of the logic circuit 248) to functionally operate as two separate comparators, however eliminating the process mismatch that inherently occurs between two separate comparators. In this way, efficiency and accuracy of the calibration loop 210 is increased by eliminating comparator mismatch from consideration in performing the calibration disclosed herein.

For example, based on the toggling of the switch 240 and the switch 244 at the duty cycle discussed above, the comparator 246 operates in a first phase (e.g., corresponding to operation as the first comparator) and a second phase (e.g., corresponding to operation as the second comparator). During the first phase, the switch 240 is closed and the switch 244 is open. During the first phase, the value of the signal present at node 260 is approximately the same as the value of the signal present at node 258 and the value of the signal present at node 256 is approximately equal to the value of the signal present at node 254 plus the value of the voltage source 242. Further, during the first phase, the comparator 246 determines whether the switching frequency is greater than the frequency of the reference clock (e.g., outside of an upper limit, set by the voltage source 242, with respect to the reference frequency of the reference clock). During the second phase, the switch 240 is open and the switch 244 is closed. During the second phase, the value of the signal present at node 260 is approximately the same as the value of the signal present at node 258 minus the value of the voltage source 238 and the value of the signal present at node 256 is approximately equal to the value of the signal present at node 254. Further, during the second phase, the comparator 246 determines whether the switching frequency is less than the frequency of the reference clock (e.g., outside of a lower limit, set by the voltage source 238, with respect to the reference frequency of the reference clock).

Based on a result of the comparison, the logic circuit 248 generates a control signal for controlling the counter 250. For example, when the comparator 246 indicates during the first phase that the switching frequency is not greater than the frequency of the reference clock and determines during the second phase that the switching frequency is not less than the frequency of the reference clock, the logic circuit 248 outputs a signal indicating that the switching frequency is within the upper and lower limits set by the voltage source 238 and the voltage source 242 with respect to the frequency of the reference clock. When the comparator 246 indicates during the first phase that the switching frequency is greater than the frequency of the reference clock, the logic circuit 248 outputs a signal to the counter 250 that controls the counter 250 to decrement a count value of the counter. When the comparator 246 indicates during the second phase that the switching frequency is less than the frequency of the reference clock, the logic circuit 248 outputs a signal to the counter 250 that controls the counter 250 to increment the count value of the counter.

In at least some examples, as discussed above, the counter 250 is capable of counting in both positive and negative direction (e.g., an up/down counter). Based on the output of the logic circuit 248, and at a rising edge of the delayed version of the first pulse-width modulated signal (e.g., or any other clock signal received by the counter 250 in place of the delayed version of the first pulse-width modulated signal), the counter 250 increments or decrements an internally stored value and outputs the internally stored value to signal line 252. In at least one example, the output of the counter 250 is a digital value having a plurality of bits (e.g., 6 bits, represented as Q<5:0>). In some examples, upon initiation of the controller 200, Q begins at a value of approximately one-half of its maximum value to provide headroom for both positive and negative directional movement. In various examples, the controller 200 may be modified such that Q may have any suitable and/or desired number of bits, for example, based at least partially on a desired degree of granularity in controlling the amount of capacitance present between node 222 and ground node 224 of the TON generator 202.

In at least one example, based on the output of the counter 250 provided via the signal line 252, one or more of the plurality of switches 216A, 216B, . . . 216N toggles to couple (or decouple) one or more corresponding capacitors of the plurality of capacitors 212A, 212B, . . . 212N to (or from) node 222. For example, when the output of the counter 250 increases in value, one or more of the plurality of switches 216A, 216B, . . . 216N toggles to couple one or more corresponding capacitors of the plurality of capacitors 212A, 212B, . . . 212N to node 222. When the output of the counter 250 decreases in value, one or more of the plurality of switches 216A, 216B, . . . 216N toggles to decouple one or more corresponding capacitors of the plurality of capacitors 212A, 212B, . . . 212N from node 222. An amount of capacitance present between node 222 and ground node 224 is approximately equal to a sum of the capacitance values of each capacitor 212A, 212B, . . . 212N and capacitor 218 coupled between node 222 and ground node 224. By modifying the amount of capacitance coupled between node 222 and ground node 224, the TON time is increased or decreased. For example, by increasing the amount of capacitance coupled between node 222 and ground node 224, TON is increased. By decreasing the amount of capacitance coupled between node 222 and ground node 224, TON is decreased.

In other examples, no change is made to the state of the plurality of switches 216A, 216B, . . . 216N based on the output of the counter 250. For example, when no change occurs in the output of the counter 250, and/or the switching frequency is within the upper and lower limits set by the voltage source 238 and the second voltage source 242 with respect to the reference clock, no change is made to the state of the plurality of switches 216A, 216B, . . . 216N based on the output of the counter 250. Based on the state of the plurality of switches 216A, 216B, . . . 216N and a resulting amount of capacitance present between node 222 and ground node 224, the controller 200 continues to control the gate driver 206 to control the power converter 228 as described above.

Figure 3:
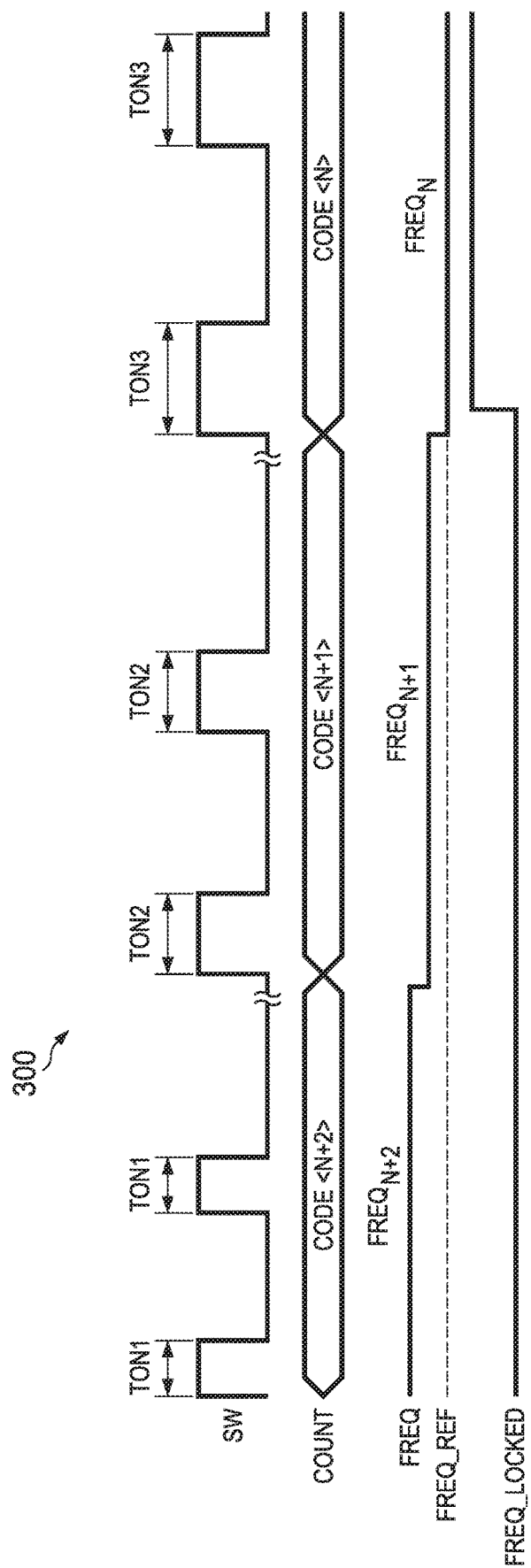
FIG. 3 shows a timing diagram of illustrative signal waveforms in accordance with various examples.

Referring now to FIG. 3, a timing diagram 300 of illustrative signal waveforms in accordance with various examples is shown. In at least one example, the diagram 300 is representative of at least some signals present in the system 100 of FIG. 1 and/or the controller 200 of FIG. 2.

Illustrated in diagram 300 are a control signal (SW) representative of voltage at a terminal of a transistor (e.g., such as a high-side transistor) of a power converter, a counter output (COUNT) of a counter generating a digital control signal having a plurality of bits (e.g., such as the signal Q<5:0>, discussed above), a representation of the frequency (FREQ) of SW, a representation of a desired frequency (FREQ_REF) of SW, and a signal (FREQ_LOCKED) indicating an approximate lock of FREQ to FREQ_REF.

In some examples, SW is a control signal for controlling a high-side transistor of a power converter. In other examples, SW is representative of a voltage present at a terminal (e.g., source terminal) of the transistor of the power converter. In some examples, COUNT is a generated control signal output by a counter that counts up and/or down based on the value of FREQ with respect to FREQ_REF. For example, as illustrated in FIG. 3, when FREQ is greater than FREQ_REF, COUNT counts down until FREQ is approximately equal to FREQ_REF. Conversely, and not shown in FIG. 3, when FREQ is less than FREQ_REF, COUNT counts up until FREQ is approximately equal to FREQ_REF. In at least some examples, COUNT has a relationship to TON. For example, COUNT may be used to control a TON generator that directly or indirectly controls a period of time of TON. As shown in FIG. 3, as COUNT decreases from CODE<N+2> to CODE<N+1> to <CODE<N>, corresponding to a decrease in FREQ from $FREQ_{N+2}$ to $FREQ_{N+1}$ to $FREQ_N$, TON increases (e.g., decreasing FREQ) from a first TON time of TON1 to a second TON time of TON2 and a third TON time of TON3, where TON2 is greater than TON1 and TON3 is greater than TON2. Although not shown, when COUNT increases, TON decreases (e.g., increasing FREQ). When (or slightly after, such as after a processing delay) FREQ is approximately equal to FREQ_REF, FREQ_LOCKED transitions from a low value to a high value.

In various examples, SW corresponds to a signal present at node 226 of FIG. 2 and is represented in terms of voltage versus time. COUNT corresponds to an output of the counter 250 and present on the signal line 252, each of FIG. 2, and is represented in terms of digital bits versus time. FREQ is representative of the frequency of SW (e.g., as output by the PWM generator circuit 230 and/or the signal present at node 254, each of FIG. 2) and is represented in terms of voltage versus time. FREQ_REF is representative of a signal present at node 258 of FIG. 2 and is represented in terms of voltage versus time. FREQ_LOCKED is representative of an output of logic circuit 248 of FIG. 2 and is represented in terms of voltage versus time.

Figure 4:
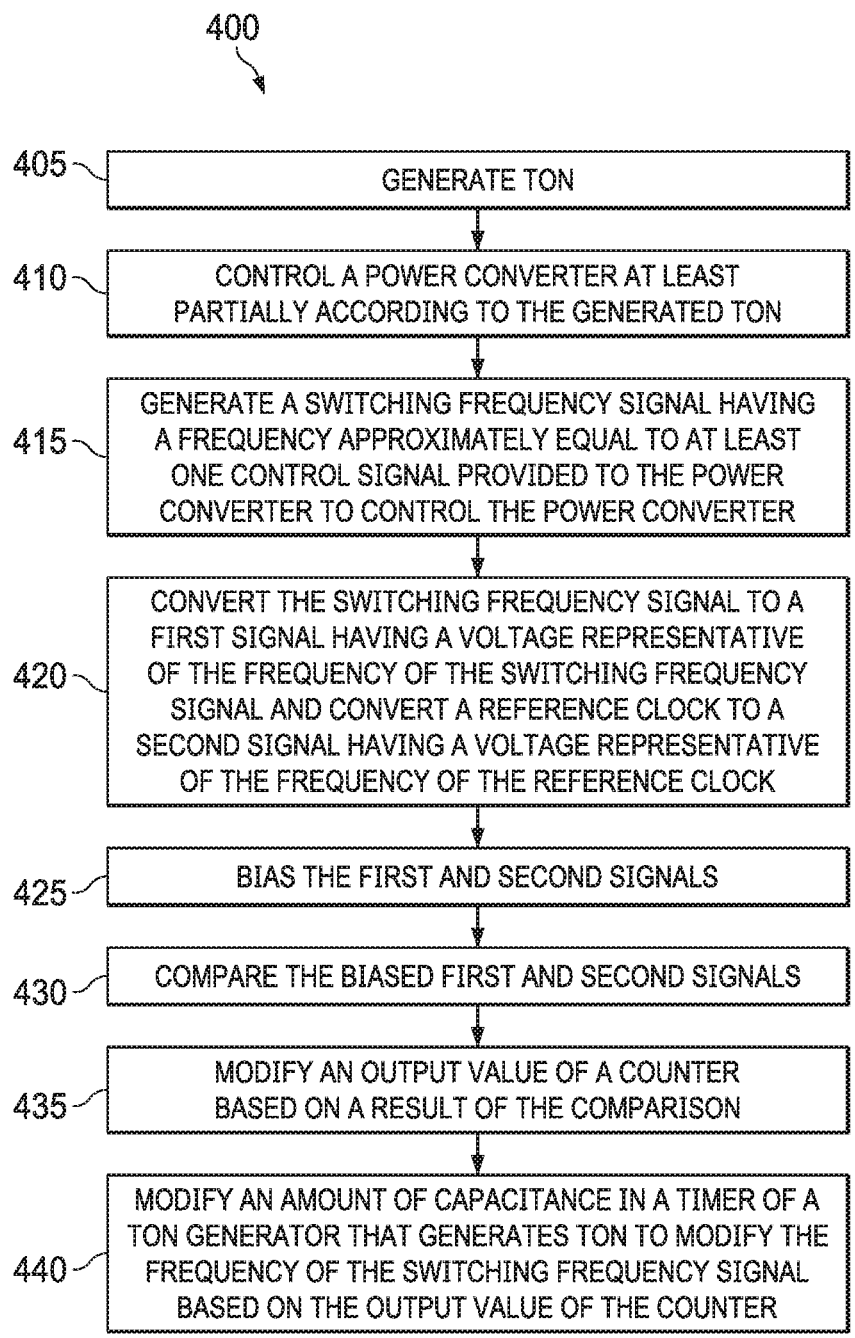
FIG. 4 shows a flowchart of an illustrative method in accordance with various examples.

Referring now to FIG. 4, a flowchart of an illustrative method 400 in accordance with various examples is shown. In some embodiments, the method 400 illustrates a method of controlling a power converter. Accordingly, in at least some examples, at least some aspects of the method 400 are implemented by a controller, such as the controller 200 of FIG. 2 and/or the controller 115 of FIG. 1. In at least some examples, the method 400 at least partially implements self-calibration of TON in a controller configured to control a power converter.

At operation 405, TON is generated. TON is generated, in at least some examples, based on a timing circuit such as resistor-capacitor timer (e.g., of a TON generator). The RC timer, in various examples, includes a switched capacitor array, a programmable capacitor, a variable capacitor, a tunable capacitor, or any other element or elements having the capability to vary an amount of capacitance present between two nodes.

At operation 410, a power converter is controlled at least partially according to the generated TON. In some examples, a gate driver that is itself controlled, at least partially, based on the generated TON, controls the power converter. In various examples, the gate driver is further controlled according to one or more signals indicative or representative of a value of a signal present in the power converter (e.g., an output signal of the power converter, a value of an inductor current signal of the power converter, etc.). The gate driver, in some examples, controls the power converter by generating and providing one or more control signals to gate terminals of transistors of the power converter.

At operation 415, a switching frequency signal is generated having a frequency approximately equal to at least one of the one or more controls signals generated and provided by the gate driver. At operation 420, the switching frequency signal is converted to a signal having a voltage representative of a frequency of the switching frequency signal and a reference clock is converted to a signal having a voltage representative of a frequency of the reference clock. At operation 425, the signals generated at operation 420 are biased. In some examples, the biasing defines upper and lower limits for variation of the frequency of the switching frequency signal (and correspondingly the value of the signal having a voltage representative of a frequency of the switching frequency signal) from the frequency of the reference clock (and correspondingly the value of the signal having a voltage representative of a frequency of the reference clock). In some examples, the biasing is performed by introducing a DC bias to the signals generated at operation 420. In some examples, bias values are preset and unchanging, while in other examples, the bias values are programmable and or variable to vary the upper and lower limits for acceptable variation of the frequency of the switching frequency signal from the frequency of the reference clock.

At operation 430, the biased signals are compared to determine whether the frequency of the switching frequency signal is within the upper and lower limits for acceptable variation from the frequency of the reference clock. When the frequency of the switching frequency signal is within the upper and lower limits for acceptable variation from the frequency of the reference clock the controller continues controlling the power converter according to presently utilized parameters.

At operation 435, when the frequency of the switching frequency signal is not within the upper and lower limits for acceptable variation from the frequency of the reference clock, a counter modifies an output value based on a result of the comparison. For example, when the frequency of the switching frequency signal is greater than the frequency of the reference clock, the counter decrements the output value. When the frequency of the switching frequency signal is less than the frequency of the reference clock, the counter increments the output value.

At operation 440, an amount of capacitance in the RC timer is modified based on the output value generated by the counter to modify the frequency of the switching frequency signal. For example, when the output value generated by the counter increases in value, the amount of capacitance in the RC timer is increased. When the output value generated by the counter decreases in value, the amount of capacitance in the RC timer is decreased. In various examples, the amount of capacitance in the RC timer is modified by toggling one or more switches based on the output value generated by the counter, tuning a tunable capacitor based on the output value generated by the counter, programming a variable capacitor based on the output value generated by the counter, or any other suitable process for modifying the amount of capacitance in the RC timer based on the output value generated by the counter.

While the operations of the method 400 have been discussed and labeled with numerical reference, the method 400 may include additional operations that are not recited herein, any one or more of the operations recited herein may include one or more sub-operations, any one or more of the operations recited herein may be omitted, and/or any one or more of the operations recited herein may be performed in an order other than that presented herein (e.g., in a reverse order, substantially simultaneously, overlapping, etc.), all of which is intended to fall within the scope of the present disclosure.

In the foregoing discussion, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., MOSFET, n-type MOSFET (NMOS), p-type MOSFET (PMOS), etc.), these components may be exchanged for components of other process technologies (e.g., replace MOSFET with bi-polar junction transistor (BJT), replace NMOS with PMOS or vice versa, etc.) and reconfiguring circuits including the replaced components to provide desired functionality at least partially similar to functionality available prior to the component replacement. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/− 10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. An apparatus comprising:
a gate driver configured to generate a pulse width modulation (PWM) signal for driving a power converter, the gate driver configured to adjust a dead-time of the PWM signal and sustain an on-time of the PWM signal in response to an output voltage change of the power converter; and
a calibration circuit coupled to the gate driver, the calibration circuit including:
a reference clock generator configured to generate a reference clock signal at the reference clock frequency;
a first frequency-to-voltage converter (FVC) having an input coupled to receive the reference clock signal, and an output configured to deliver a first voltage representative of the reference clock frequency;
a second FVC having an input coupled to receive the PWM signal, and an output configured to deliver a second voltage representative of the switching frequency of the PWM signal; and
a comparator having a first input coupled to the output of the first FVC, a second input coupled to the output of the second FVC, and an output for adjusting the calibration signal;
wherein the calibration circuit is configured to generate a calibration signal for adjusting the on-time of the PWM signal so as to equalize a switching frequency of the PWM signal with a reference clock frequency.

2. The apparatus of claim 1, wherein the gate driver is configured to reduce the dead-time of the PWM signal and sustain the on-time of the PWM signal in response to the output voltage dropping below a reference voltage.

3. The apparatus of claim 1, wherein the gate driver is configured to increase the dead-time of the PWM signal and sustain the on-time of the PWM signal in response to the output voltage rising above a reference voltage.

4. The apparatus of claim 1, further comprising:
a detector having a first input coupled to a feedback node of the power converter, a second input coupled to receive a reference voltage, and an output coupled to the gate driver, wherein the feedback node is configured to receive a feedback voltage proportional to the output voltage.

5. The apparatus of claim 1, further comprising:
an on-time generation circuit having:
a first input configured to receive a switch signal from a switch node of the power converter;
a second input configured to receive the calibration signal; and
a network configured to generate a delayed switch signal based on the calibration signal.

6. The apparatus of claim 5, wherein the delayed switch signal delayed from the switch signal by the adjusted on-time for equalizing the switching frequency of the PWM signal with the reference clock frequency.

7. The apparatus of claim 5, wherein the network includes:
a resistor having a first terminal coupled to the first input, and a second terminal;
a plurality of capacitors arranged in parallel, each having a first terminal selectively coupled to the second terminal of the resistor based on the calibration signal, and a second terminal coupled to a ground terminal; and
a network output coupled to the second terminal of the resistor, and configured to deliver the delayed switch signal.

8. The apparatus of claim 5, further comprising:
a comparator having a first input coupled to receive the switch signal, a second input coupled to receive the delayed switch signal, and a comparator output coupled to the gate driver for adjusting the on-time of the PWM signal.

9. The apparatus of claim 1, wherein the calibration circuit includes a counter configured to generate the calibration signal having a digital count representative of a difference between the switching frequency and the reference clock frequency.

10. An apparatus comprising:
a gate driver configured to generate a pulse width modulation (PWM) signal for driving a power converter, the gate driver configured to adjust a dead-time of the PWM signal and sustain an on-time of the PWM signal in response to an output voltage change of the power converter; and
a calibration circuit coupled to the gate driver, the calibration circuit including:
a reference clock generator configured to generate a reference clock signal at the reference clock frequency;
a first frequency-to-voltage converter (FVC) having an input coupled to receive the reference clock signal, and an output configured to deliver a first voltage representative of the reference clock frequency;
a second FVC having an input coupled to receive the PWM signal, and an output configured to deliver a second voltage representative of the switching frequency of the PWM signal; and
a comparator having a first input coupled to the output of the first FVC, a second input coupled to the output of the second FVC, and an output for adjusting the calibration signal;
wherein the calibration circuit is configured to generate a calibration signal for adjusting the on-time of the PWM signal based on a comparison between a switching frequency of the PWM signal and a reference clock frequency.

11. The apparatus of claim 10, wherein the gate driver is configured to reduce the dead-time of the PWM signal and sustain the on-time of the PWM signal in response to the output voltage dropping below a reference voltage.

12. The apparatus of claim 10, wherein the gate driver is configured to increase the dead-time of the PWM signal and sustain the on-time of the PWM signal in response to the output voltage rising above a reference voltage.

13. The apparatus of claim 10, wherein the calibration signal is configured to increase the on-time of the PWM signal based on the switching frequency of the PWM signal being higher the reference clock frequency.

14. The apparatus of claim 10, wherein the calibration signal is configured to reduce the on-time of the PWM signal based on the switching frequency of the PWM signal being less than the reference clock frequency.

15. The apparatus of claim 10, wherein the calibration circuit includes a counter configured to generate the calibration signal having a digital count representative of a difference between the switching frequency and the reference clock frequency.

16. An apparatus comprising:
a gate driver configured to generate a pulse width modulation (PWM) signal for driving a power converter, the gate driver configured to adjust a dead-time of the PWM signal and sustain an on-time of the PWM signal in response to an output voltage change of the power converter;
a calibration circuit coupled to the gate driver, and configured to generate a calibration signal based on a comparison between a switching frequency of the PWM signal and a reference clock frequency, the calibration circuit including:
a reference clock generator configured to generate a reference clock signal at the reference clock frequency;
a first frequency-to-voltage converter (FVC) having an input coupled to receive the reference clock signal, and an output configured to deliver a first voltage representative of the reference clock frequency;
a second FVC having an input coupled to receive the PWM signal, and an output configured to deliver a second voltage representative of the switching frequency of the PWM signal; and
a comparator having a first input coupled to the output of the first FVC, a second input coupled to the output of the second FVC, and an output for adjusting the calibration signal; and
an on-time generation circuit coupled to the calibration circuit, and configured to generate a delayed switch signal delayed from a switch signal of the power converter by a delay time based on the calibration signal,
wherein the gate driver is configured to adjust the on-time of the PWM signal in response to the delay time.

17. The apparatus of claim 16, wherein the gate driver is configured to reduce the dead-time of the PWM signal and sustain the on-time of the PWM signal in response to the output voltage dropping below a reference voltage.

18. The apparatus of claim 16, wherein the gate driver is configured to increase the dead-time of the PWM signal and sustain the on-time of the PWM signal in response to the output voltage rising above a reference voltage.

19. The apparatus of claim 16, wherein the calibration signal is configured to increase the delay time based on the switching frequency of the PWM signal being higher the reference clock frequency, and the gate driver is configured to increase the on-time of the PWM signal based on the increased delay time.

20. The apparatus of claim 16, wherein the calibration signal is configured to reduce the delay time based on the switching frequency of the PWM signal being less than the reference clock frequency, and the gate driver is configured to reduce the on-time of the PWM signal based on the reduced delay time.

* * * * *